(12) United States Patent
Cohen

(10) Patent No.: US 7,775,437 B2
(45) Date of Patent: Aug. 17, 2010

(54) METHODS AND DEVICES FOR DETECTING LINKABLE OBJECTS

(75) Inventor: Ronald H. Cohen, Pasadena, CA (US)

(73) Assignee: Evryx Technologies, Inc., Glendale, CA (US)

( * ) Notice: Subject to any disclaimer, the term of this patent is extended or adjusted under 35 U.S.C. 154(b) by 444 days.

(21) Appl. No.: 11/445,784

(22) Filed: Jun. 1, 2006

(65) Prior Publication Data

US 2007/0279521 A1    Dec. 6, 2007

(51) Int. Cl.
    *G06K 7/10*    (2006.01)
(52) U.S. Cl. .............. 235/462.45; 235/462.3; 235/462.1; 235/462.07; 235/462.11; 235/462.21; 235/472.02; 235/375
(58) Field of Classification Search ............ 235/462.45, 235/462.3, 461.1, 462.07, 462.11, 462.21, 235/472.02, 375
See application file for complete search history.

(56) References Cited

U.S. PATENT DOCUMENTS

| 6,522,889 | B1 | 2/2003 | Aarnio |
| 6,674,993 | B1 | 1/2004 | Tarbouriech |
| 7,016,532 | B2 | 3/2006 | Boncyk et al. |
| 2005/0014531 | A1 | 1/2005 | Findikli |
| 2005/0208457 | A1* | 9/2005 | Fink et al. .................... 434/112 |
| 2005/0258253 | A1* | 11/2005 | Muramatsu ............ 235/472.02 |
| 2006/0113389 | A1* | 6/2006 | Barkan .................. 235/462.21 |
| 2007/0084926 | A1* | 4/2007 | Lopez et al. ................. 235/454 |
| 2007/0205283 | A1* | 9/2007 | Vesikivi et al. .............. 235/451 |
| 2008/0021953 | A1 | 1/2008 | Gil |
| 2009/0141986 | A1* | 6/2009 | Boncyk et al. .............. 382/209 |

\* cited by examiner

*Primary Examiner*—Allyson N Trail
(74) *Attorney, Agent, or Firm*—Fish & Associates, PC

(57) ABSTRACT

A camera portion of a portable consumer device obtains data from a field of view, and at least a portion of the data is used to determine existence of an object in the field of view for which the information is available from a reference source. An indication is then provided to the user that the object is in the field of view. This can all be accomplished by a functionality, such as computer software, that executes on one or both of the device and a distal server. Objects within the field that the system can identify and provide information are deemed "linkable." Once a user is presented with an indication of which objects around him are linkable, he can then directly point and click on the linkable objects without the "trial-and-error" process of pointing and clicking on non-linkable objects.

25 Claims, 2 Drawing Sheets

METHODS AND DEVICES FOR DETECTING LINKABLE OBJECTS

FIELD OF THE INVENTION

The field of the invention is radios, televisions and other media players.

BACKGROUND

U.S. Pat. No. 7,016,532 describes a system and process through which a user can access information pertinent to an object using a camera-equipped device. In that patent, an image of the object is captured by the device, the object is recognized using image recognition technology, an information address is returned to the device, and the information address is used to access information. A typical embodiment of that patent uses a camera-equipped mobile telephone to "point and click" on an object, and then uses information from the image to access a web site pertinent to the object. Herein the phrase "point and click" means to aim the camera-equipped device at an object, capture an image, and send the image or information derived from the image to a server. The server can be close to, or distant from, the device. The server can be part of the device or the device can be part of the server.

When a user "points and clicks" as described above, the object might or might not be in the server's database (the term "database" herein refers to any collection of information, and is not limited to relational or other software databases). If it is not, then a message can be sent to the user advising the user that no objects in the image were identified and that the user should make another attempt. If this occurs often then the user can execute several "point and click" operations without a successful link to information in which case the user will likely become disappointed. This problem worsens if relatively few of the objects in the user's environment are represented in the server database. The cause of this situation is that the user does not know which objects in his environment are in the server database.

Thus, a problem remains that users might not know what objects are in his field of view, for which information is available, and thus might not focus on those objects.

SUMMARY OF THE INVENTION

This problem can be remedied by indicating to the user which objects in his environment that are "linkable." The term "linkable" herein means that the object is represented in the server database and therefore if the user points and clicks on it the user will obtain a valid result, i.e. the user will be able to access information related to the object. If the user is presented with an indication of which objects around him are linkable, he can then directly point and click on the linkable objects without the "trial-and-error" process of pointing and clicking on non-linkable objects.

Systems, methods, and devices are thus contemplated in which a camera portion of a portable consumer device obtains data from a field of view, at least a portion of the data is used to determine existence of an object in the field of view for which the information is available from a reference source, and an indication is provided to the user that the object is in the field of view. This can all be accomplished by a functionality, such as computer software, that executes on one or both of the device and a distal server. Methods include providing that functionality, either by marketing or selling a telephony device that includes the software, or by marketing or selling software as an add-on product that can be loaded onto the device.

Preferred systems and methods involve a camera equipped cell or other mobile phone, hand-held computer, and/or a personal digital assistant (PDA). Such devices can be held so that the field of view is substantially stationary during a relevant time period, or moved so that the field of view changes and the data being processed includes a video stream or other series of images. It is further contemplated that objects for which information is available can move within the field of view, and/or enter or exit the field of view.

All suitable indications are contemplated for notifying the user that an object (for which information is available) is in the field of view. For example, contemplated indications include any of graphic and/or text displayed on a display of the device, a sound, tactile feedback, and a email, text message, or other electromagnetic signal.

It is especially contemplated that preferred systems, methods, and devices described herein will be able to identify human beings, text, two- or other dimensional bar codes, and other symbolic and graphic codes as objects.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
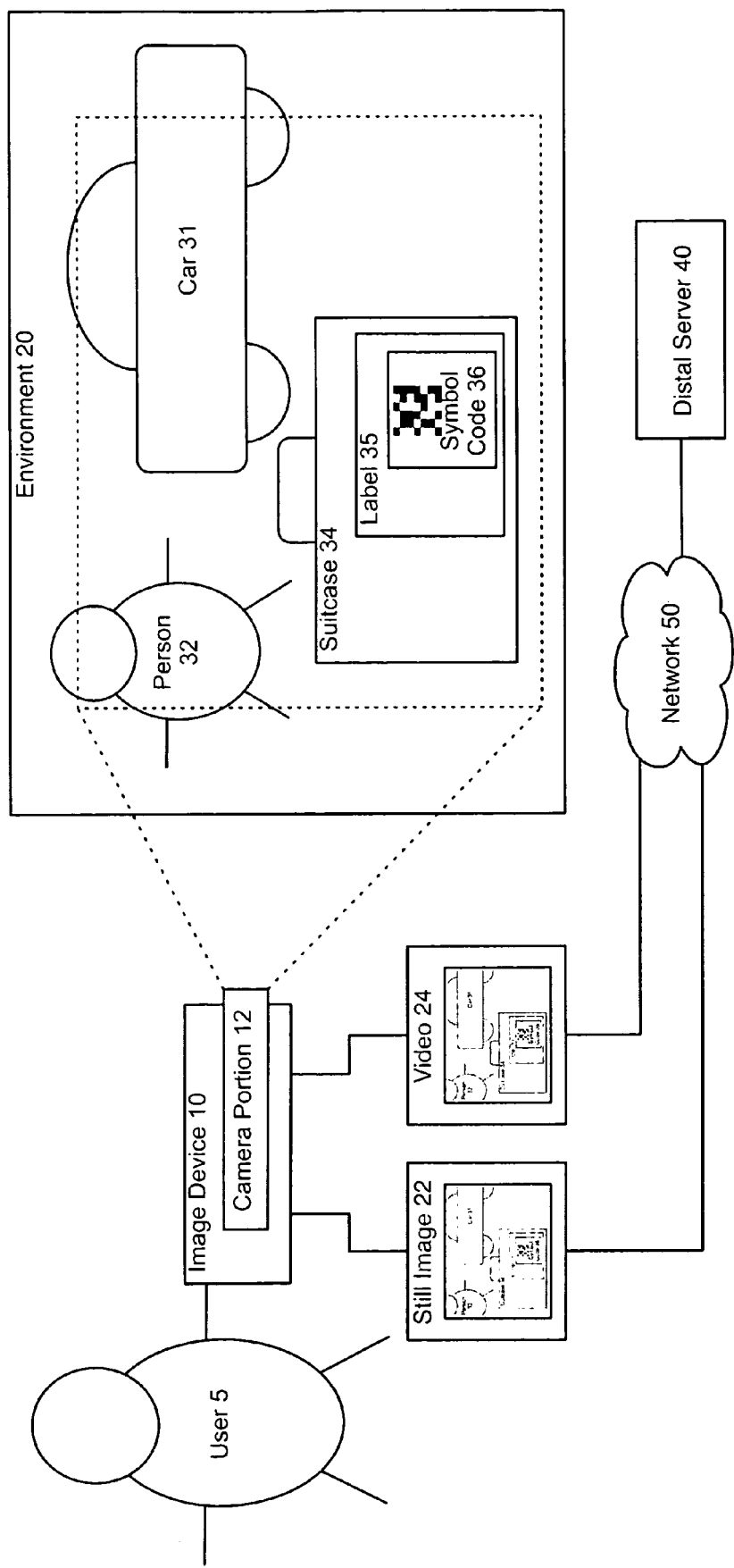
FIG. 1 is a schematic of a user panning the camera of a telephony device about his environment, the device being wirelessly coupled to a distal server.

In FIG. 1, a user 5 pans the camera portion 12 of his imaging device 10 about his environment 20, first capturing various fields of view as still images 22, and then as a five second video comprising a series of images 24. Within the environment are various objects, including a car 31, a person 32, a suitcase 34 to which is affixed a label 35 having a symbol code 36. A distal server 40 is wirelessly coupled to the device 10 by a network 50.

As contemplated herein, the term "user" refers to a human being, as opposed to an entirely automated system. Actions taken by the user 5 can be performed indirectly, but are preferably performed directly using hands, voice commands, and the like.

The imaging device 10 should be interpreted as a generic representation of any device that can electronically capture image data or the equivalent. Charge Coupled Devices (CCDs), for example, do not technically capture an image, but a cell phone having a CCD camera is considered herein to be an imaging device because the data captured by the device can (and in that example is) converted to an image. Imaging device 10 should thus be interpreted as representing any of a digital still camera, a digital video camera, a digital camera having both still and video capabilities, a cell phone or PDA with a built in camera, and also a laptop or similar device having a built-in or peripheral camera. It is further contemplated that the camera portion can comprise multiple cameras, which can point in different directions providing increased field-of-view, or in a similar direction, providing stereoscopic capability. It is still further contemplated that the camera portion can record any spectral frequency, including but not limited to visible light. Thus, for example, the camera portion of a specialized device could detect infrared radiation or X-rays.

The various fields of view are any portions of the environment from which an image can be taken. Thus, the field of view varies as the user pans or tilts the device (or lens portion or the device), zooms in and out, etc. The images 22, 24, can be of any suitable quality, size, and so forth, so long as they provide sufficient data for the system to identify or at least classify the object or objects in the field of view.

The functionality needed to process the data, identify or classify the objects, and apprise the user of same, could theoretically be located entirely on the device, but much more likely is spread out among the device 10, the distal server 40, and other resources accessible by the distal server 40.

Symbol code 36 is intended to generically represent both a bar code and codes other than bar codes.

Figure 2:
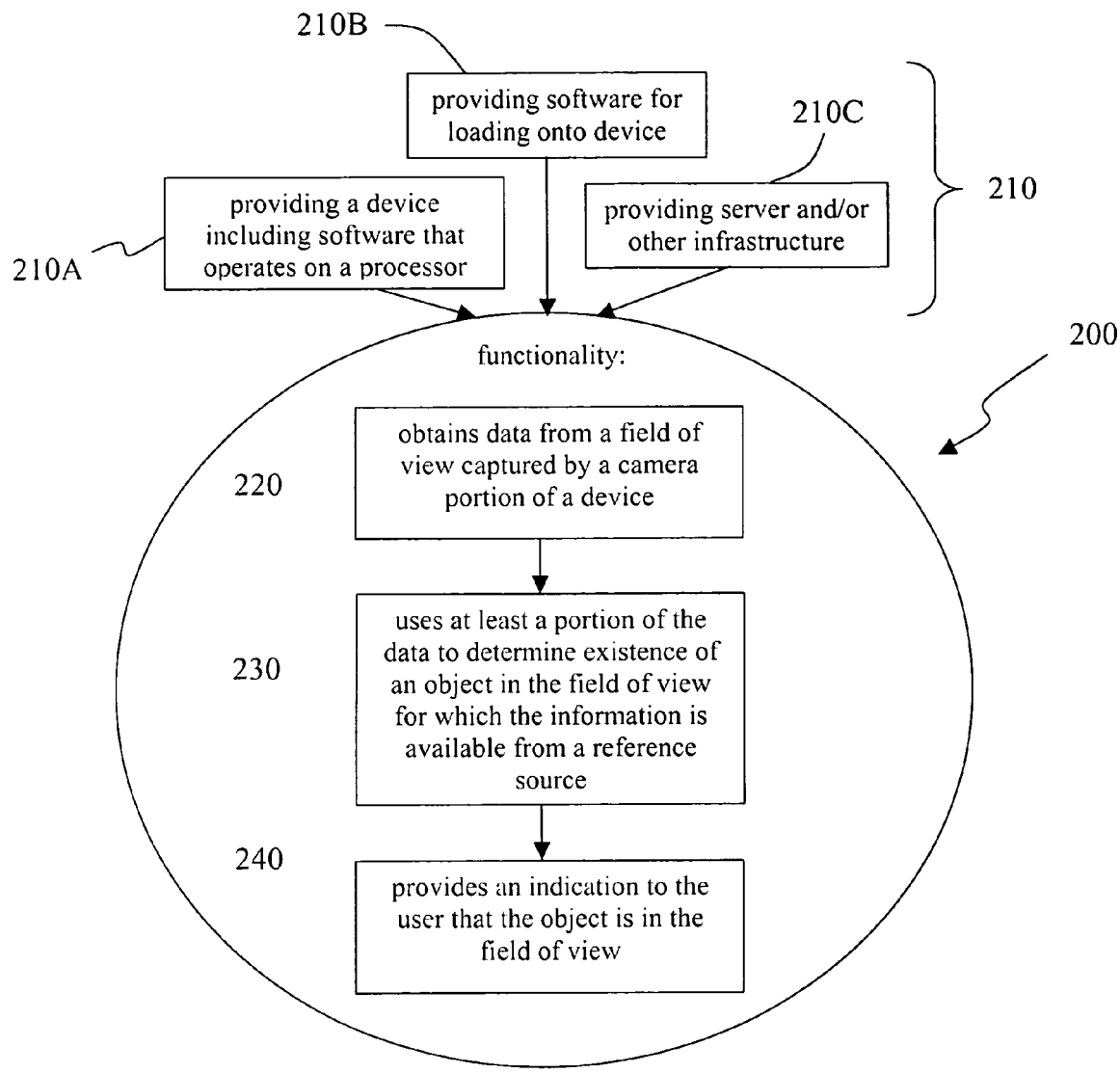
FIG. 2 is a flowchart showing steps in a preferred class of methods.

In FIG. 2, a preferred class of methods 200 generally includes the following steps: providing functionality 210 in one or more of various ways 210A, 210B, 210C; that obtains data from a field of view captured by a camera portion of a device 220, uses at least a portion of the data to determine existence of an object in the field of view for which the information is available from a reference source 230, and provides an indication to the user that the object is in the field of view 240. Three major classes of ways that the functionality can be provided are providing a device that includes at least a portion of the needed software 210A, providing software (by sale, license or otherwise) for loading onto device 210B, and providing the distal server and/or other infrastructure 210C that cooperates with the device to provide the functionality. In step 210A, the processor should be interpreted as any physical component(s) that can comparison or other analytical operations on an image or image data. Thus, the term "processor" includes not only microprocessors and other logical electronic devices such as programmable ALUs (Arithmetic Logic Units), but also analog devices that use wave interference patterns or other optical characteristics to produce resonances or other indications of an image match.

Image Capture And Transmission

The user can use the device in any practicable manner to capture one or more images of the environment. In a simple case the user merely aims the lens of the camera at some portion of the environment. The camera need not actually take and store a picture, because in at least preferred embodiments the device is executing software that continuously monitors whatever is in the field of view. At all times, or more preferably when the software recognizes characteristics in the image, the device transmits some or all of the following to a detection service:

The imagery;
A portion of the imagery;
Information calculated from the imagery.

Detection

There must, of course, be some detection service by which the system determines which objects in the user's environment are linkable (i.e. for which the system can recognize and has information that it can provide to the user). The detection service can be resident in the device, in one or more distal machines, such as computers, or in a combination of these. Moreover, the process of detection can include image processing (such as image contrast enhancement), and this image processing can occur in the device, the distal machines, or a combination of these. Image processing, image/object detection, and image recognition can be arbitrarily distributed among components of the system and can be performed via any combination of software, digital software, analog hardware, and optical means.

Regardless of where the detection service is located, the service functions to detect one or more objects in the imagery. The detection service can do this by a) comparing the imagery, or information derived from the imagery, to information stored in a database, or b) determining whether components of the imagery meet certain criteria, or c) by any other suitable means.

The detection service can perform image recognition in order to detect the objects and thus determine the identity of the objects during the detection process. In this case the detected objects can be considered "identified." Alternatively, the detection service can only detect the presence of the objects in the imagery without determining their specific identity, with the specific identification performed subsequently. In this case the detected objects can be considered "identifiable."

Obtaining Information

Once an object has been identified in the imagery, information regarding the objects is then sent from the server to the device and presented to the user. This information can include anything of interest, including for example any or all of the following:

An indication of whether or not objects are present in the imagery;
The identity of the objects;
The location of the objects in the imagery;
The information addresses associated with the objects; and
Velocities of objects in the imagery.

Providing the Information to the User

After device obtains the information, the device can display some or all of the information, or perhaps just notify the user that there is information. Display can be accomplished in any suitable manner. For example, if the information is merely whether an identified object is or is not present in the image, then the device might merely display an indication that an object was or was not detected in the imagery, as the case can be. This could well consist of a binary indication to the user, comprising, for example, text, colors, or sounds to indicate to the user whether an object was or was not identified in the image.

If the information comprises the identity of the identified object(s), then the device displays the identity of the object(s). This can be accomplished by displaying text that identifies the object(s). Other means of providing object identity to the user include speech, sound, images, and graphics. The text, images, or graphics indicating the identity of the object(s) can include hyperlinks, in which case the user can activate these links to access further information.

If the information comprises the location of the identified or identifiable object(s) in the imagery then the device displays the location, within the camera field of view, of the object(s). This can be accomplished by the device displaying marks that indicate the location of the identified object(s), superimposed on the imagery. Such marks can be graphics, text, symbols, or images. As there can be a time delay between the capture of the imagery and the provision of the information, the information can be superimposed on the real time image (static or dynamic) that is observed by the camera at the time of receipt of the information, as opposed to being superimposed on the original imagery, which can be several seconds old. The information can be superimposed on either the original imagery or the real time image (or both), depending on the particular application and circumstances.

If the information comprises the information address(es) of the identified object(s) then the device displays the information address(es) or a representation of the address(es). This can be accomplished by displaying the information addresses as text, hyperlinked text, hyperlinked graphics, or other appropriate means.

Any or all of the above types of information can be displayed by themselves, or in any combination. For example, object identity and object location in imagery can be combined by presenting descriptive text, symbols, or graphics on the device screen in a manner that conveys both the identity of the objects and their location within the camera field of view.

Information regarding the objects can thus be provided in any useful manner, including for example:

- Graphic symbols superimposed on imagery and displayed on a screen that is part of the device;
- Text, for example, a list of objects appearing in the imagery;
- "Pop-up" text or graphics: text or graphics that appear as a user moves a cursor or pointer over a object in the imagery;
- A sound;
- Initiation of a software process;
- A radio signal;
- A telephone call; and
- Transmission of information to another device or to a computer.

Any or all of the above types of responses can be accomplished in any suitable manner. For example, the user could be notified by sending the information to the device and then the device displaying the information to the user, or by sending an information address to the device and the device then accessing the information at the address (e.g. accessing a web page via a web browser), with said information comprising the information. Information can also be provided to the device, and hence to the user, as single items of information, as a continuous stream of information, or both. Information can be provided to the device in real time or not in real time.

The process described above can be performed as a single-pass process, as a continuous process, or as a hybrid of these. In the single-pass case, the process is executed based on a single image. In the continuous case, the process is executed on a continuous imagery stream, e.g. video. In both cases, the indications of object presence, location, identity, and information address can be superimposed on the captured imagery. The indications can be provided or displayed individually or in any combination.

The indications can be updated as the imagery changes. The field of view of the device camera can change, for example, by panning, zooming, rotating, or translating, thus causing corresponding changes in the imagery. These changes can cause the position of objects in the imagery to change, can cause objects to move out of the camera field of view and thus disappear from the imagery, and can cause objects to enter the field of view and thus appear in the imagery. The indications can be updated according to such changes. For example, if a user is rotating (panning) the device, including the camera, then objects will move in the imagery. The positions of the objects are indicated on the device screen, for example, by showing graphic symbols on, near, or otherwise associated with the objects within the imagery. As the user moves the device, the objects move within the imagery and the graphics move accordingly, continuously updating to indicate the position of the objects within the imagery.

Similarly, if sound is used to indicate the objects then the sound can change according to the position, size, velocity, or orientation of objects in the imagery.

Contemplated embodiments can be used in a myriad of ways, including for example, to monitor the positions and velocities of objects based on the appearance of objects in imagery. Since this system is tracking objects as they move in the imagery, the system can 1) record and report the positions and velocities of the objects and 2) take an action if the positions or velocities reach certain conditions. For example, the device or server can send a software instruction an email, or other notification if objects in the imagery move closer or farther than some distance limit from each other, or if objects in the imagery exceed a velocity limit.

Another contemplated use is facilitation of a game, by indicating to a user the presence, location, identity, and/or velocity of an object related to a game, on the screen of the device. In that case the user can activate a hyperlink related to a object, which can advantageously be done by selecting (or "clicking on") an object representation on the device screen or by selecting the object in a list. Such selection and activation can be done via a cursor, stylus, mouse, finger, or other pointing device. Furthermore, the user or game software can perform other actions based on the presence, location, velocity, and/or other information related to the object. For example, the object may be comprise or represent a component of a game, including a player or character, and the detection of the object thus may cause other actions to occur in the game. Similarly, the user may initiate interactions with the object, including communication, competition, information access, or simulated combat.

User Actions

Alter the information is received and presented, the user can either do nothing, or take any of numerous different actions. Possible user actions include:

- Capturing additional imagery because no object was identified.
- Capturing additional imagery because multiple objects were identified and the user wishes to obtain information on fewer than all of the identified objects.
- Selecting at least one identified or identifiable objects to access information or content, pertinent to the identified object, at the hyperinformation address. This can be done by selecting hyperlinks.

SPECIFIC EMBODIMENTS

Embodiment 1

A user aims a mobile device at multiple objects. The objects can be, for example, multiple magazines on display at a newsstand, multiple human beings, or various objects on a city street, including automobiles, human beings, stores, and buildings. The user presses a button or selects a menu item which causes a camera in the mobile device to capture an image of the set of objects. The image is preferably transmitted to an external detection service within a distal server via a mobile telephone network and the Internet, but could be transmitted in any suitable manner, including for example a hard wire link. The detection service compares the image to image characteristics of various objects stored in a database. Via such comparison, the detection service identifies objects within the image. The server then creates a web page containing a list oil the identified objects and provides that web page to the mobile device, via a network or networks such as a mobile telephone network and/or the Internet. The user then selects, from the web page list, one or more objects. The user then views online content at the information addresses corresponding to the items he selected.

Embodiment 2

As in Embodiment 1, a user aims a mobile device at objects, captures an image, the image is sent to a service, and the service recognizes objects in the image. In Embodiment 2, however, the service sends to the user's device a version of the captured image that includes indications of the identified object within the image. This marked image is displayed to the user by the device. The identified objects can be marked with graphics. The identified objects can be marked with text to indicate the their identity or other information about the them, such as information addresses or online content associated with them. Such markings, including graphics, text, or other images, can be interactive: they can appear on the screen as the user indicates interest in the region of the screen image containing the object, such interest being indicated by moving a cursor, pointer, finger, other pointing mechanism, or other such means.

Embodiment 3

A user aims a camera-equipped device at objects. The device captures real-time imagery (e.g., video) of the scene containing the objects. The imagery is transmitted to a detection service that detects objects in the imagery by comparing the imagery or information derived from the imagery to image characteristics of known objects. If the imagery is provided as a continuous stream then the detection service operates continuously on the imagery stream provided from the device. The detection service provides responses to the device, indicating the presence of detected objects, their position in the scene, their identity, their type, pertinent information address(es), and/or other information about the objects. The responses are provided continuously as the objects are detected. The response information is displayed by the device to the user. This information can superimposed on the imagery or on the current real time image (still or motion) from the camera, thus providing a real-time display of the presence of objects to the user, along with their location in the scene or field of view. As the user changes the field-of-view of the camera, by zooming, panning, or moving the camera, objects can move into or out of the field of view and can change position in the field of view. The indicators of detected objects move, on the screen, along with the objects. To access information pertinent to an object, the user selects the screen marker pertinent to that object, via a cursor, finger, mouse, or other pointing device. The device then accesses information at an information address pertinent to the object, said information address being provided by the detection service.

Embodiment 4

It is especially contemplated that the systems, methods, and devices described herein can be used to identify individuals. Furthermore, the invention can be used to monitor movement of individuals by dynamically updating the positions of the individuals in the camera view display.

Embodiment 5

The systems, methods, and devices described herein can also be used to facilitate a game. For example, the invention can identify objects, including persons, with which the user or game software can then interact.

Embodiment 6

The systems, methods, and devices described herein can also be used to detect the relative positions or velocities of objects and initiate an appropriate action. For example, the proximity and relative velocities of parts of a machine be deduced from their positions within imagery, and a warning can then be issued if the machine parts reach some minimum or maximum distance or relative velocity.

Embodiment 7

The systems, methods, and devices described herein can also be used to detect temperature or chemical composition of objects from the spectral frequency content of the imagery by using image sensors capable of detecting the appropriate electromagnetic spectral frequencies. Temperature and chemical information associated with detected objects can be provided to the user on the image display.

Embodiment 8

The systems, methods, and devices described herein can also be used to detect objects that are obscured to human vision, for example, objects inside a human body, a suitcase, or a shipping container, by using an X-ray imaging sensor or other imaging sensor capability of imaging such visually obscured objects.

Embodiment 9

The systems, methods, and devices described herein can provide an indication to the user or to a computing device upon detection of certain objects or conditions. For example, an indication can be provided upon detecting the presence of a certain individual, or upon detecting that an object in the imagery has a temperature above a certain limit, or that an object in the imagery is emitting radiation of a certain type, or that certain objects within the imagery have reached certain distances or velocities relative to each other or relative to the camera.

Embodiment 10

A user can be notified that object was detected by communicating with an extrinsic device. For example, if the detected object is a device, such as a vending machine (with a network connection) then the service or other portion of the system could transmit information to the detected object indicating that such detection has occurred. The detected object could then provide an indication to the user that it has been detected. Such indication can consist of a sound, a light, display of information on a screen, or other communication with the user, device, or other persons, devices, or software processes.

Embodiment 11

Detection of an object can be based on time variations in the imagery. An object within the imagery can emit modulated light (e.g. light pulses). The modulated light is in wavelengths visible to the device camera but can or can not be visible to humans. The detection service identifies the object by detecting the light frequency, information coded in the modulated light, or both. This embodiment is useful, for example, for locating a person. The person to be located carries a device that emits light pulses. The light pulses are identified and the location of emitting device, and thus the person carrying it, are displayed on the screen of the device, superimposed on real time imagery of device camera field of view, thus providing a guide towards locating the person.

Embodiment 12

A mobile camera-equipped device is connected to a head-mounted display (e.g. glasses) that display graphics, text, and video to a user. The connection between the head-mounted display and the device may be via wire, radio, infrared, or other means. As the user moves the device, the user can observe, in the display, detected objects and information pertinent to them. This information may be superimposed on the camera field of view and/or on the user's actual field of view through the glasses. This embodiment is useful for games. Game graphics may superimposed on the real world scene. The user may observe and interact with real world objects, objects that exist only in software, or combinations of theses. The appearance, as viewed by the user, of detected real world objects may be modified by the software.

It should be apparent to those skilled in the art that many more modifications besides those already described are possible without departing from the inventive concepts herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps could be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of helping a user utilize a portable consumer device to obtain information, the method comprising providing a functionality that:
    obtains data from a field of view captured by a camera portion of the device;
    uses at least a portion of the data to determine existence of at least one object in the field of view;
    identifies the at least one object as a linkable object for which information is made available from a reference source; and
    provides an indication to the user that the at least one object is in the field of view, and is a linkable object having information available from the reference source upon user selection of the at least one object by displaying a mark superimposed on a displayed image of the field of view where the mark indicates a location of the linkable object with respect to the field of view.

2. The system of claim 1, wherein the functionality includes image processing software that runs on a processor in the device.

3. The system of claim 2, wherein the step of providing the functionality comprises at least one of marketing and selling a telephony device that includes the software.

4. The system of claim 2, wherein the step of providing the functionality comprises at least one of providing the software for loading onto the device.

5. The system of claim 1, wherein the functionality includes an image matching service that runs on a processor in a server distal to the device.

6. The system of claim 1, wherein the data comprises image data.

7. The system of claim 1, wherein the device comprises a mobile telephone.

8. The system of claim 1, wherein the device is selected from the group consisting of a hand-held computer and a personal digital assistant (PDA).

9. The system of claim 1, further comprising displaying the information on a display of the device.

10. The system of claim 1, wherein the data is a single image of the field of view.

11. The system of claim 1, wherein the data includes a plurality of images that arise from moving the device.

12. The system of claim 1, wherein the data includes a plurality of images that depict movement of the object.

13. The system of claim 1, wherein the data includes a plurality of images that depict entry of a second, different object into the field of view, for which second information is available from the reference source.

14. The system of claim 1, wherein the indication comprises a graphic displayed on a display of the device.

15. The system of claim 1, wherein the indication comprises text displayed on a display of the device.

16. The system of claim 1, wherein the indication comprises at least one of a graphic and text superimposed on the object on a display of the device.

17. The system of claim 1, wherein the indication comprises outlining at least a portion of the object on a display of the device.

18. The system of claim 1, wherein the indication comprises a sound.

19. The system of claim 1, wherein the indication comprises tactile feedback to the user.

20. The system of claim 1, wherein the indication comprises transmission of an electromagnetic signal.

21. The system of claim 20, wherein the electromagnetic signal is selected from the list consisting of an email and a text message.

22. The system of claim 1, wherein the indication comprises activation of a software process.

23. The system of claim 1, wherein the functionality is capable of identifying the object as human being.

24. The system of claim 1, wherein the functionality is capable of identifying the object as a barcode.

25. The system of claim 1, wherein the functionality is capable of identifying the object as a symbol other than a barcode.

* * * * *